United States Patent
Renault

(10) Patent No.: US 11,472,266 B2
(45) Date of Patent: Oct. 18, 2022

(54) ENGINE EXHAUST GAS COOLING SYSTEM FOR TRANSPORT REFRIGERATION SYSTEM

(71) Applicants: CARRIER CORPORATION, Palm Beach Gardens, FL (US); Loic Renault, Saint Etienne du Rouvray (FR)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 26 days.

(21) Appl. No.: 16/332,021

(22) PCT Filed: Sep. 16, 2016

(86) PCT No.: PCT/IB2016/001559
§ 371 (c)(1),
(2) Date: Mar. 11, 2019

(87) PCT Pub. No.: WO2018/051164
PCT Pub. Date: Mar. 22, 2018

(65) Prior Publication Data
US 2019/0202268 A1    Jul. 4, 2019

(51) Int. Cl.
*B60H 1/32* (2006.01)
*F25D 11/00* (2006.01)
(Continued)

(52) U.S. Cl.
CPC ......... *B60H 1/3226* (2013.01); *B60H 1/3227* (2013.01); *F01N 3/02* (2013.01); *F25D 11/003* (2013.01); *F25D 23/003* (2013.01)

(58) Field of Classification Search
CPC .. B60H 1/3226; B60H 1/3227; B60H 1/0045; F01N 3/02; F25D 11/003
See application file for complete search history.

(56) References Cited

U.S. PATENT DOCUMENTS 3,691,772 A    9/1972 Cross
4,531,379 A    7/1985 Diefenthaler, Jr.
(Continued)

FOREIGN PATENT DOCUMENTS

CN    2777207 Y    5/2006
DE    10301438 A1    7/2004
(Continued)

OTHER PUBLICATIONS

Notification of Transmittal of the International Search Report for International Application No. PCT/IB2016/001559 Report dated Apr. 24, 2017; Report Received Date: Apr. 24, 2017; 6 pages.
(Continued)

*Primary Examiner* — Tavia Sullens
(74) *Attorney, Agent, or Firm* — Cantor Colburn LLP

(57) ABSTRACT

A transport refrigeration system (200) including: a refrigeration unit (22) having a refrigerant heat rejection heat exchanger (34) and a fan (40) configured to blow air across the refrigerant heat rejection heat exchanger; a first engine (26) configured to power the refrigeration unit (22), the first engine (26) having an engine coolant circuit (80) and an exhaust outlet (27); a heat exchanger (70) having: a first fluid passage (72) fluidly connected to the exhaust outlet (27); and a second fluid passage (74) fluidly connected to the engine coolant circuit (80); and a third fluid passage (76) fluidly connected to and configured to receive air blown across the refrigerant heat rejection heat exchanger (34). The second fluid passage (74) is thermally connected to the first fluid passage (72) and the third fluid passage (76) is thermally connected to the first fluid passage (72).

11 Claims, 6 Drawing Sheets

(51) Int. Cl.
*F25D 23/00* (2006.01)
*F01N 3/02* (2006.01)

(56) References Cited

U.S. PATENT DOCUMENTS

| | | | |
|---|---|---|---|
| 5,099,651 A * | 3/1992 | Fischer | F25B 13/00 |
| | | | 62/79 |
| 6,178,744 B1 | 1/2001 | Perset | |
| 6,363,717 B1 | 4/2002 | Kschischo et al. | |
| 6,543,531 B1 * | 4/2003 | Casar | B60H 1/3204 |
| | | | 62/160 |
| 6,708,485 B2 | 3/2004 | Hinder et al. | |
| 7,266,943 B2 | 9/2007 | Kammel | |
| 7,673,447 B2 | 3/2010 | Gaiser | |
| 8,297,049 B2 | 10/2012 | Ohtani | |
| 8,327,634 B2 | 12/2012 | Orihashi et al. | |
| 8,360,192 B2 | 1/2013 | Kruger | |
| 8,839,613 B2 | 9/2014 | Levin et al. | |
| 8,910,471 B2 | 12/2014 | Park | |
| 2014/0223933 A1 | 8/2014 | Steele et al. | |
| 2014/0250941 A1 * | 9/2014 | Steele | F25D 11/003 |
| | | | 62/323.1 |
| 2014/0338310 A1 | 11/2014 | Peng | |
| 2015/0253058 A1 | 9/2015 | Casasanta | |

FOREIGN PATENT DOCUMENTS

| | | |
|---|---|---|
| GB | 2414690 A | 12/2005 |
| WO | 2013043389 A1 | 3/2013 |
| WO | 2013043391 A2 | 3/2013 |

OTHER PUBLICATIONS

Written Opinion of the International Searching Authority for International Application No. PCT/IB2016/001559; Report dated Apr. 24, 2017; Report Received Date: Apr. 24, 2017; 9 pages.

* cited by examiner

ENGINE EXHAUST GAS COOLING SYSTEM FOR TRANSPORT REFRIGERATION SYSTEM

CROSS-REFERENCE TO RELATED APPLICATIONS

This application is based on International Application No. PCT/IB2016/001559 filed Sep. 16, 2016, which is incorporated herein by reference in its entirety.

BACKGROUND OF THE DISCLOSURE

The embodiments herein generally relate to transport refrigeration systems and more specifically, the engine exhaust systems of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transport refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven. Transport refrigeration systems may also be electrically driven. In an electrically driven transport refrigeration system, a prime mover carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

The prime mover typically is an engine carried on and considered part of the transport refrigeration unit, while the vehicle includes a separate engine to power the vehicle. Natural gas is often looked at as a replacement to the more conventional option, diesel, to power the engine that drives the refrigeration unit. Engines that burn natural gas to power transportation refrigeration units often produce higher exhaust temperatures than their diesel counterparts. A system to bring the exhaust temperature of a natural gas engine closer to that of a diesel vehicle is desired.

BRIEF DESCRIPTION OF THE DISCLOSURE

According to one embodiment, a transport refrigeration system is provided. The transport refrigeration system having: a refrigeration unit having: a refrigerant heat rejection heat exchanger and a fan configured to blow air across the refrigerant heat rejection heat exchanger; a first engine configured to power the refrigeration unit, the first engine having an engine coolant circuit and an exhaust outlet; a heat exchanger having: a first fluid passage fluidly connected to the exhaust outlet; and a second fluid passage fluidly connected to the engine coolant circuit; and a third fluid passage fluidly connected to and configured to receive air blown across the refrigerant heat rejection heat exchanger. The second fluid passage is thermally connected to the first fluid passage and the third fluid passage is thermally connected to the first fluid passage.

In addition to one or more of the features described above, or as an alternative, further embodiments of the transport refrigeration system may include that the second fluid passage is thermally connected to the third fluid passage.

In addition to one or more of the features described above, or as an alternative, further embodiments of the transport refrigeration system may include that the first fluid passage is fluidly connected to the engine exhaust outlet through a muffler.

In addition to one or more of the features described above, or as an alternative, further embodiments of the transport refrigeration system may include that the first engine is powered by at least one of compressed natural gas and liquefied natural gas.

In addition to one or more of the features described above, or as an alternative, further embodiments of the transport refrigeration system may include that engine coolant circulating through the coolant circuit and the second fluid passage absorbs heat from engine exhaust gas flowing through the first fluid passage and the engine exhaust gas is cooled.

In addition to one or more of the features described above, or as an alternative, further embodiments of the transport refrigeration system may include that air blowing across the refrigerant heat rejection heat exchanger and through the third fluid passage absorbs heat from engine exhaust gas flowing through the first fluid passage and the engine exhaust gas is cooled.

According to another embodiment, a method of operating a transport refrigeration system is provided. The method having the steps of: cooling, using a refrigeration unit, a refrigerated cargo space, the refrigeration unit having: a refrigerant heat rejection heat exchanger and a fan configured to blow air across the refrigerant heat rejection heat exchanger; powering, using a first engine, the refrigeration unit, the first engine having an engine coolant circuit and an exhaust outlet; and cooling, using a heat exchanger, engine exhaust gas from the exhaust outlet, the heat exchanger having: a first fluid passage fluidly connected to the exhaust outlet; a second fluid passage fluidly connected to the engine coolant circuit; and a third fluid passage fluidly connected to and configured to receive air blown across the refrigerant heat rejection heat exchanger. The second fluid passage is thermally connected to the first fluid passage and the third fluid passage is thermally connected to the first fluid passage.

In addition to one or more of the features described above, or as an alternative, further embodiments of the method of operating the transport refrigeration system may include that the second fluid passage is thermally connected to the third fluid passage.

In addition to one or more of the features described above, or as an alternative, further embodiments of the method of operating the transport refrigeration system may include that the first fluid passage is fluidly connected to the engine exhaust outlet through a muffler.

In addition to one or more of the features described above, or as an alternative, further embodiments of the method of operating the transport refrigeration system may include powering the first engine using at least one of compressed natural gas and liquefied natural gas.

In addition to one or more of the features described above, or as an alternative, further embodiments of the method of operating the transport refrigeration system may include that circulating engine coolant through the coolant circuit and the second fluid passage; flowing engine exhaust gas through the first fluid passage; and cooling the engine exhaust gas by using the engine coolant to absorb heat.

In addition to one or more of the features described above, or as an alternative, further embodiments of the method of operating the transport refrigeration system may include blowing air across the refrigerant heat rejection heat exchanger and through the third fluid passage; flowing engine exhaust gas through the first fluid passage; and cooling the engine exhaust gas by using the air blown across the refrigerant heat rejection heat exchanger to absorb heat.

According to another embodiment, a method of assembling a transport refrigeration system is provided. The method having the steps of: positioning a refrigeration circuit within a refrigeration unit, the refrigeration circuit having a refrigerant heat rejection heat exchanger and a fan configured to blow air across the refrigerant heat rejection heat exchanger; operably connecting a first engine to the refrigeration circuit, the first engine being configured to power the refrigeration unit and having an engine coolant circuit and an exhaust outlet; and operably connecting a heat exchanger to the first engine, the heat exchanger having: a first fluid passage fluidly connected to the exhaust outlet; a second fluid passage fluidly connected to the engine coolant circuit; and a third fluid passage fluidly connected to and configured to receive air blown across the refrigerant heat rejection heat exchanger. The second fluid passage is thermally connected to the first fluid passage and the third fluid passage is thermally connected to the first fluid passage.

In addition to one or more of the features described above, or as an alternative, further embodiments of the method of assembling the transport refrigeration system may include that the second fluid passage is thermally connected to the third fluid passage.

In addition to one or more of the features described above, or as an alternative, further embodiments of the method of assembling the transport refrigeration system may include that the first fluid passage is fluidly connected to the engine exhaust outlet through a muffler.

In addition to one or more of the features described above, or as an alternative, further embodiments of the method of assembling the transport refrigeration system may include that the first engine is powered by at least one of compressed natural gas and liquefied natural gas.

In addition to one or more of the features described above, or as an alternative, further embodiments of the method of assembling the transport refrigeration system may include that engine coolant circulating through the coolant circuit and the second fluid passage absorbs heat from engine exhaust gas flowing through the first fluid passage and the engine exhaust gas is cooled.

In addition to one or more of the features described above, or as an alternative, further embodiments of the method of assembling the transport refrigeration system may include that air blowing across the refrigerant heat rejection heat exchanger and through the third fluid passage absorbs heat from engine exhaust gas flowing through the first fluid passage and the engine exhaust gas is cooled.

Technical effects of embodiments of the present disclosure include a refrigeration unit powered by an engine having a heat exchanger that utilizes coolant from the engine and air blown by a fan for a refrigerant heat rejection heat exchanger of the refrigeration unit to cool engine exhaust from the engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
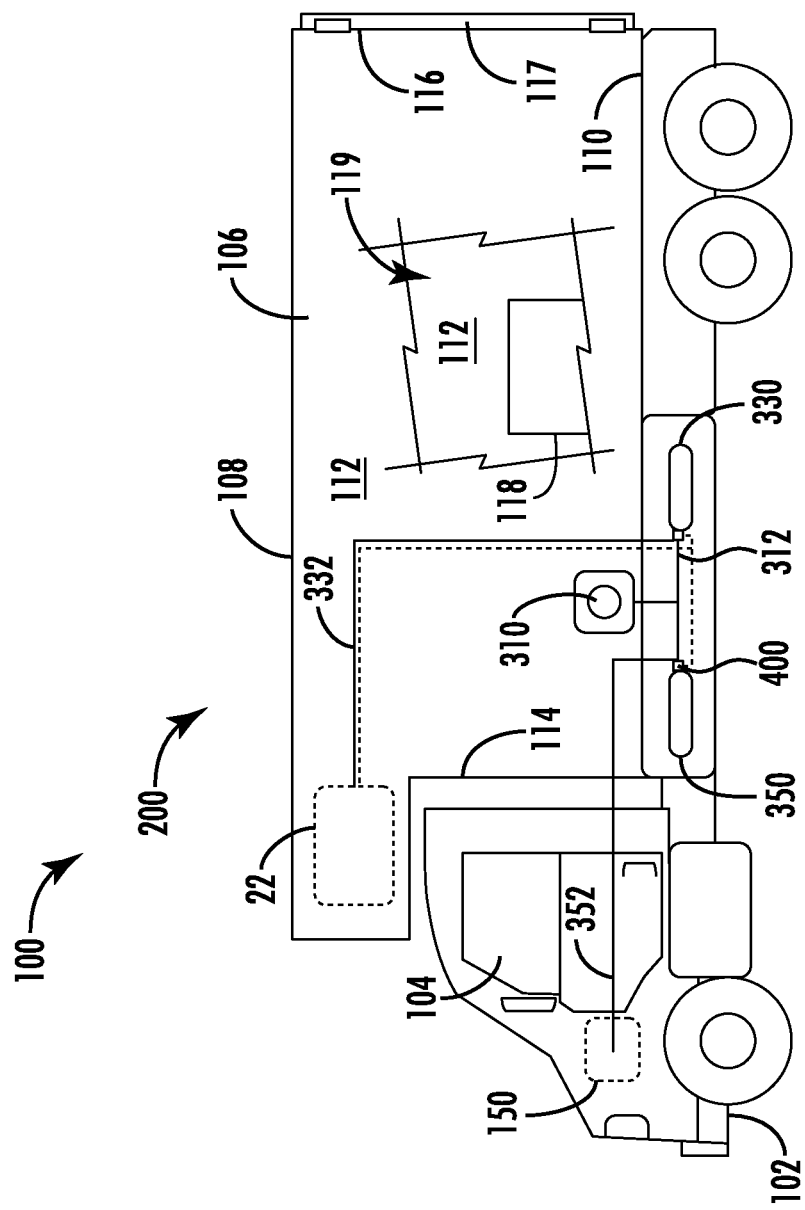
FIG. 1 is a schematic illustration of a transport refrigeration system, according to an embodiment of the present disclosure.
Figure 2:
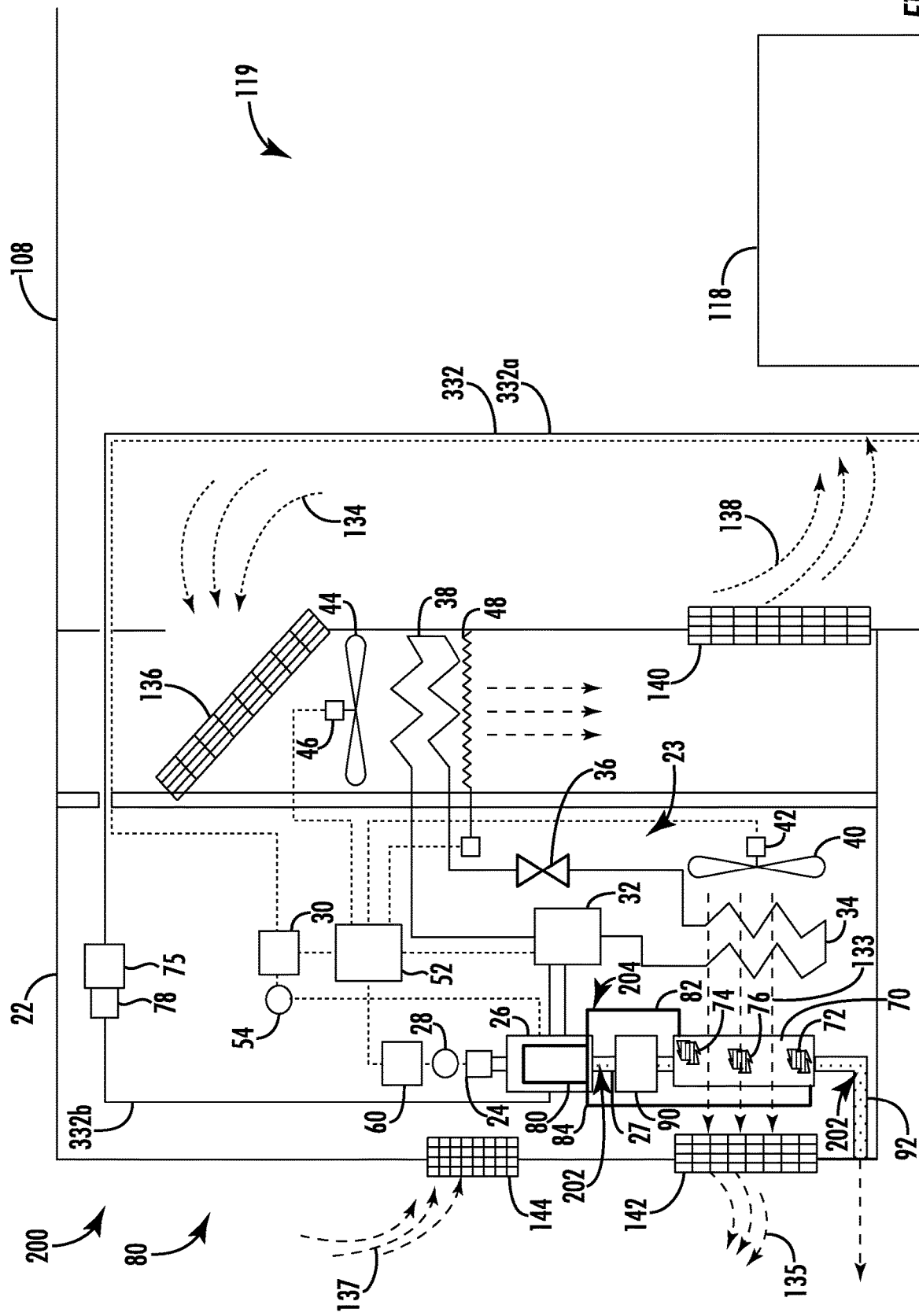
FIG. 2 is an enlarged schematic illustration of the transport refrigeration system of FIG. 1, according to an embodiment of the present disclosure.
Figure 3:
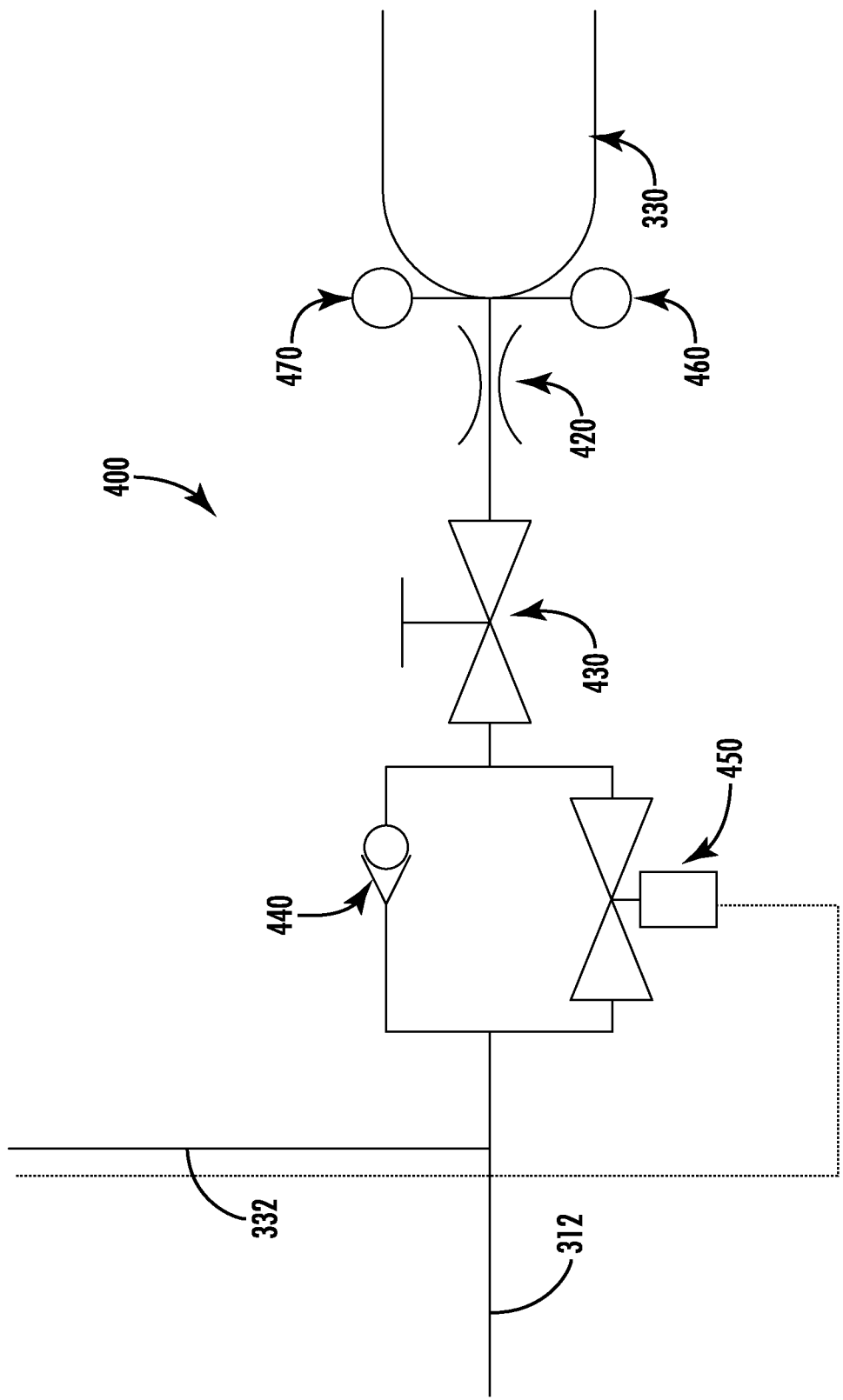
FIG. 3 is a schematic illustration of a tank connection device connected to a first fuel tank, according to an embodiment of the present disclosure.
Figure 4:
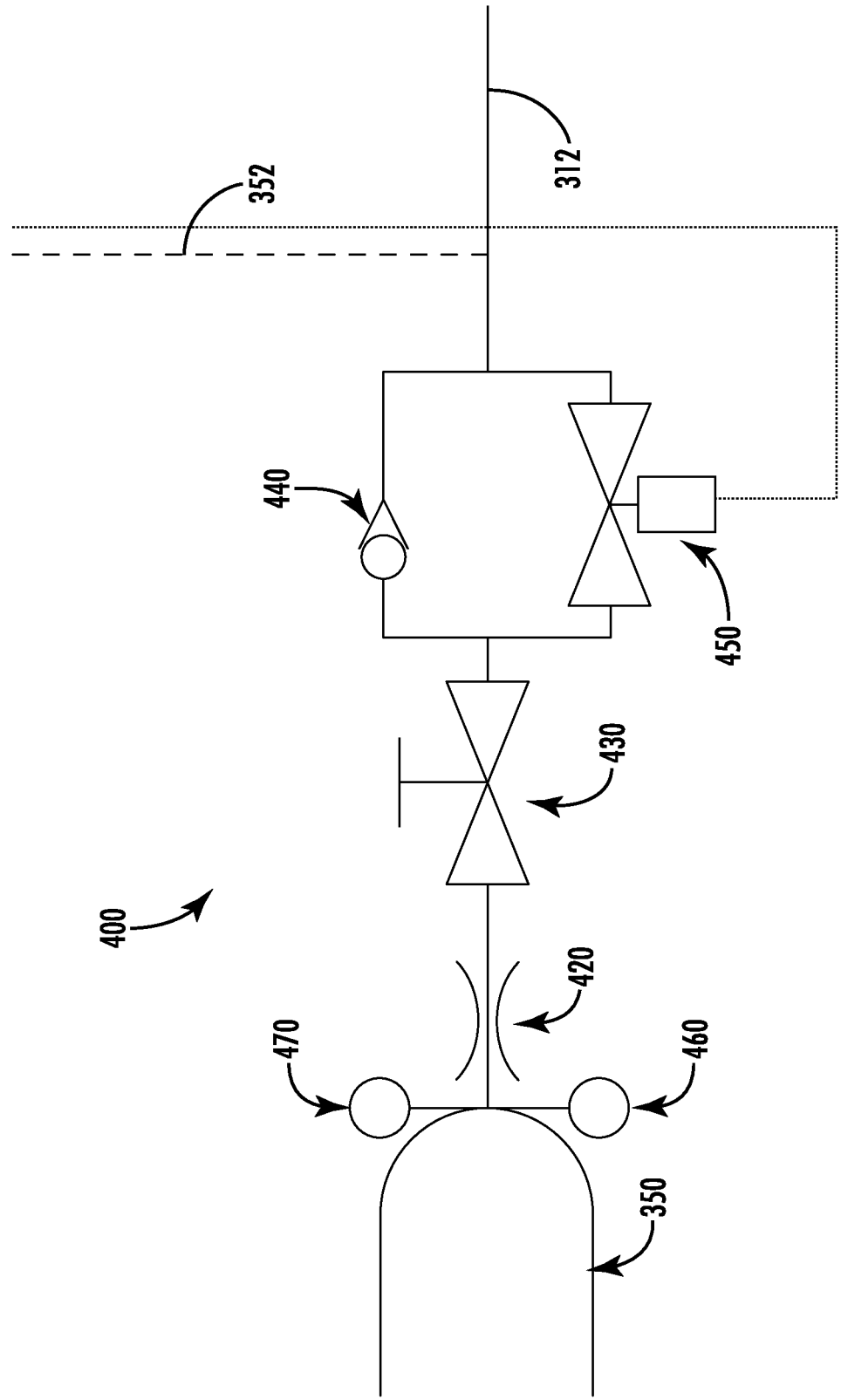
FIG. 4 is a schematic illustration of the tank connection device connected to a second fuel tank, according to an embodiment of the present disclosure.

Referring to FIGS. 1-4, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. FIG. 3 shows a schematic illustration of a tank connection device 400 connected to a first fuel tank 330, according to an embodiment of the present disclosure. FIG. 4 shows a schematic illustration of the tank connection device 400 connected to a second fuel tank 350, according to an embodiment of the present disclosure.

The transport refrigeration system 200 is being illustrated as a trailer system 100, as seen in FIG. 1. The trailer system 100 includes a vehicle 102 and a transport container 106. The vehicle 102 includes an operator's compartment or cab 104 and a second engine 150 which acts as the drive system of the trailer system 100. The fuel that powers the second engine 150 may be at least one of compressed natural gas and liquefied natural gas. In an embodiment, the fuel is compressed natural gas. In the illustrated embodiment, the fuel to power the second engine 150 of the vehicle 102 is stored in a second fuel tank 350. The second fuel tank 350 is fluidly connected to the second engine 150 through a second fuel line 352. The second fuel tank 350 is configured to supply fuel to the second engine 150 through the second fuel line 352. The transport container 106 is coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to non-trailer refrigeration such as, for example a rigid truck or a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a refrigeration unit 22 circulating refrigerant through a refrigeration circuit 23, a refrigerant compression device 32, a first engine 26 for driving the refrigerant compression device 32, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119, as known to one of ordinary skill in the art. In an embodiment, the refrigeration unit 22 is capable of providing a desired temperature and humidity range.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140, and the cooled air is referred to as supply airflow 138. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The refrigerant compression device 32 may be directly driven by the first engine 26 connected to the refrigerant by mechanical connection, such as, for example a drive shaft or belt. Alternatively, the first engine 26 may drive a power generation device, which may provide power to an electric motor to drive the refrigerant compression device 32. As seen in the illustrated embodiment, the first engine 26 may have a coolant circuit 80. The coolant circuit 80 is configured to remove heat from the first engine 26.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the first engine 26, typically through an electronic engine controller 54 operatively associated with the first engine 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

In the depicted embodiment, the first engine 26 drives a power generation device 24 to provide electrical power to the refrigeration unit 22. The drive shaft of the engine drives the electric generation device 24. The electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at at least one voltage. Some electric generation devices may have internal voltage regulators while other electric generation devices do not. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

The electrical power generated by the power generation device 24 may be stored in a battery 60. The refrigeration unit 22 has a plurality of power demand loads, including, but not limited to, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The fuel that powers the first engine 26 may be at least one of compressed natural gas and liquefied natural gas. In an embodiment, the fuel is compressed natural gas. In another embodiment, the fuel that powers the first engine 26 is the same fuel that powers the second engine 150 of the vehicle 102. In the illustrated embodiment, the fuel to power the first engine 26 is stored in a first fuel tank 330. The first fuel tank 330 is fluidly connected to the first engine 26 through a first fuel line 332. The first fuel tank 330 is configured to supply fuel to the first engine 26 through the first fuel line 332.

Airflow is circulated into and through the refrigerate cargo space 119 of the transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140.

Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

In the illustrated embodiment, the transport refrigeration system 200 includes a single filling point 310. The single filling point 310 is fluidly connected to the second fuel tank 350 and the first fuel tank 330 through a filling line 312. The single filling point 310 is configured to receive fuel from a filling station, such as for example a gas station. When the single filling point 310 receives fuel, the single filling point 310 distributes the fuel received to the second fuel tank 350 and the first fuel tank 330. As may be appreciated by one of skill in the art, the first fuel tank 330 and second fuel tank 350 may each have an individual filling point to fill the respective tank with fuel.

Further, as may be appreciated by one of skill in the art, there may be multiple first fuel tanks 330 and multiple second fuel tanks depending on the fuel requirements of the engines 26, 150. The first fuel tank 330 and the second fuel tank 350 each include a tank connection device 400, as seen in FIG. 1. The tank connection device 400 fluidly connects each tank to a single filling point 310 through the filling line 312, as shown in FIG. 1. As shown in FIGS. 3 and 4, the tank connection device 400 comprises: a pressure regulator 420 fluidly connected to one of the fuel tanks 330, 350; a thermal fuse 470; a bursting disk 460; a manual valve 430 fluidly connected to the pressure regulator 420; a check valve 440 fluidly connected to the manual valve 430 and the single refilling point 310; and a shut off valve 450 fluidly connected to the manual valve 430 and the single refilling point 310. As illustrated in FIG. 3, the shut off valve 450 may be fluidly connected in parallel to the check valve 440. The shut off valve 450 may be a solenoid valve. The shut off valve 450 may be in operative communication with the controller 30 and the controller 30 controls the operation of the shut off valve 450. The check valve 440 and the shut off valve 450 are connected to the single refilling point 310 through the filling line 312. Further, in regard to the second fuel tank 350, the check valve 440 and the shut off valve 450 are connected to the second engine 150 through the second fuel line 352, as seen in FIG. 4. Also, in regard to the first fuel tank 330, the check valve 440 and the shut off valve 450 are connected to the first engine 26 through the first fuel line 332, as seen in FIG. 4. Advantageously, the tank connection device 400 helps prevent the fuel tanks from being over filled and also allows the fuel to be consumed as commanded.

As seen in FIG. 2, the first fuel line 332 may have a regulator 75 and a pressure relief valve 78. The regulator 75 reduces the pressure of the fuel coming from the first fuel tank 330 to the first engine 26. Subsequently, the regulator 75 divides the first fuel line 332 into two portions, a high pressure portion 332a and a low pressure portion 332b. The pressure relief valve 78 may relieve pressure in the first fuel line 332 in the event pressure exceeds a selected value. The second fuel line 352 may have a similar regulator (not shown) and a pressure relief valve (not shown) between the second fuel tank 350 and the second engine 150.

In the illustrated embodiment, the transportation refrigeration unit 200 has a heat exchanger 70 configured to remove heat from engine exhaust gas 202 expelled from an exhaust outlet 27 of the first engine 26. The heat exchanger 70 has a first fluid passage 72, a second fluid passage 74, and a third fluid passage 76. The first fluid passage 72 is fluidly connected to the exhaust outlet 27 and also fluidly connected to the tail pipe 92. The first fluid passage 72 allows the allows the engine exhaust gas 202 generated by the first engine 26 to flow from the exhaust outlet 27 through the heat exchanger 70 and exit the transportation refrigeration unit 22 at the tail pipe 92. The second fluid passage 74 is fluidly connected to the engine coolant circuit 80. The coolant circuit 80 may be connected to the second fluid passage 74 via a first coolant line 82 and a second coolant line 84, as seen in FIG. 2. In one example, coolant 204 from the coolant circuit 80 may exit the coolant circuit 80 via the first coolant line 82 to enter the second fluid passage 74 and coolant 204 may exit the second fluid passage 74 via the second coolant line 84 to re-enter the coolant circuit 80. The second fluid passage 74 is thermally connected to the first fluid passage 72. Engine coolant 204 circulating through the coolant circuit 80 and the second fluid passage 74 absorbs heat from engine exhaust gas 202 flowing through the first fluid passage 72 and the engine exhaust gas 202 is cooled. The third fluid passage 76 is fluidly connected to and configured to receive air 133 blown across the refrigerant heat rejection heat exchanger 34 by the fan 40. The third fluid passage 76 is thermally connected to the first fluid passage 72. The air 133 blowing across the refrigerant heat rejection heat exchanger 34 and through the third fluid passage 76 absorbs heat from engine exhaust gas 202 flowing through the first fluid passage 72 and the engine exhaust gas 202 is cooled. Once the air 133 blows through the third fluid passage 76, the air 133 is expelled through the heat outlet 142 along with the heat 135 from the engine exhaust gas 202 and the refrigerant heat rejection heat exchanger 34

Figure 5:
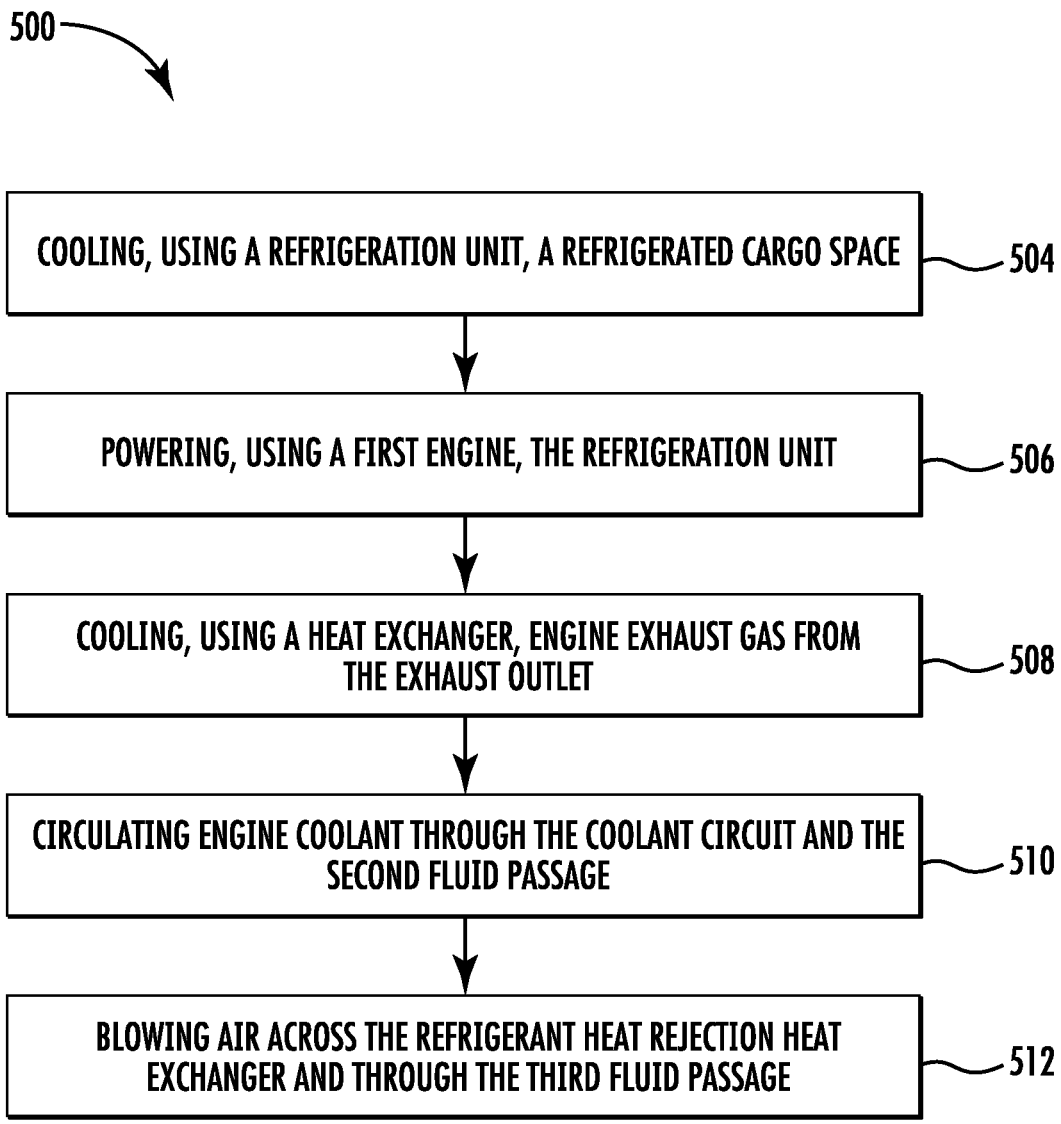
FIG. 5 is a flow diagram illustrating a method for operating a transport refrigeration system, according to an embodiment of the present disclosure.

As may be appreciated by one of skill in the art, the fluid passages 72, 74, 76 may include a variety of different fin designs, patterns, and passes to achieve the desired thermal transfer between the fluid passages 72, 74, 76. The second fluid passage 72 may also be thermally connected to the third fluid passage 76. As seen in the illustrated embodiment, the first fluid passage 72 may be fluidly connected to the engine exhaust outlet 27 through a muffler 90. The muffler 90 may also be catalytic converter, as may be appreciated by one of skill in the art. Referring now to FIG. 5, while referencing components of the transport refrigeration system 200 of FIGS. 1-4. FIG. 5 shows a flow process illustrating a method 500 of operating the transport refrigeration system 200, according to an embodiment of the present disclosure. At block 504, the refrigeration unit 22 cools the refrigerated cargo space 119. As mentioned above, the refrigeration unit 22 has a refrigerant heat rejection heat exchanger 34 and a fan 40 configured to blow air 133 across the refrigerant heat rejection heat exchanger 34. At block 506, the first engine 26 powers the refrigeration unit 22. As mentioned above, the first engine 26 has an engine coolant circuit 80 and an exhaust outlet 27.

At block 508, the heat exchanger 70 cools engine exhaust gas 202 from the exhaust outlet 27. As mentioned above, the heat exchanger 70 has a first fluid passage 72 fluidly connected to the exhaust outlet 27; a second fluid passage 74 fluidly connected to the engine coolant circuit 80; and a third fluid passage 76 fluidly connected to and configured to receive air 133 blown across the refrigerant heat rejection heat exchanger 34. The second fluid passage 74 is thermally connected to the first fluid passage 72 and the third fluid passage 76 is thermally connected to the first fluid passage 72. At block 510, the engine coolant 204 circulates through the coolant circuit 80 and the second fluid passage 74 absorbing heat from engine exhaust gas 202 flowing through the first fluid passage 72 and the engine exhaust gas 202 is cooled. The engine exhaust gas 202 flows through the first fluid passage 72 and cools the engine exhaust gas 202 by using the engine coolant 204 to absorb heat. At block 512, air 133 blows across the refrigerant heat rejection heat exchanger 34 and through the third fluid passage 76 absorbing heat from engine exhaust gas 202 flowing through the first fluid passage 72 and the engine exhaust gas 202 is cooled.

While the above description has described the flow process of FIG. 5 in a particular order, it should be appreciated that unless otherwise specifically required in the attached claims that the ordering of the steps may be varied.

Figure 6:
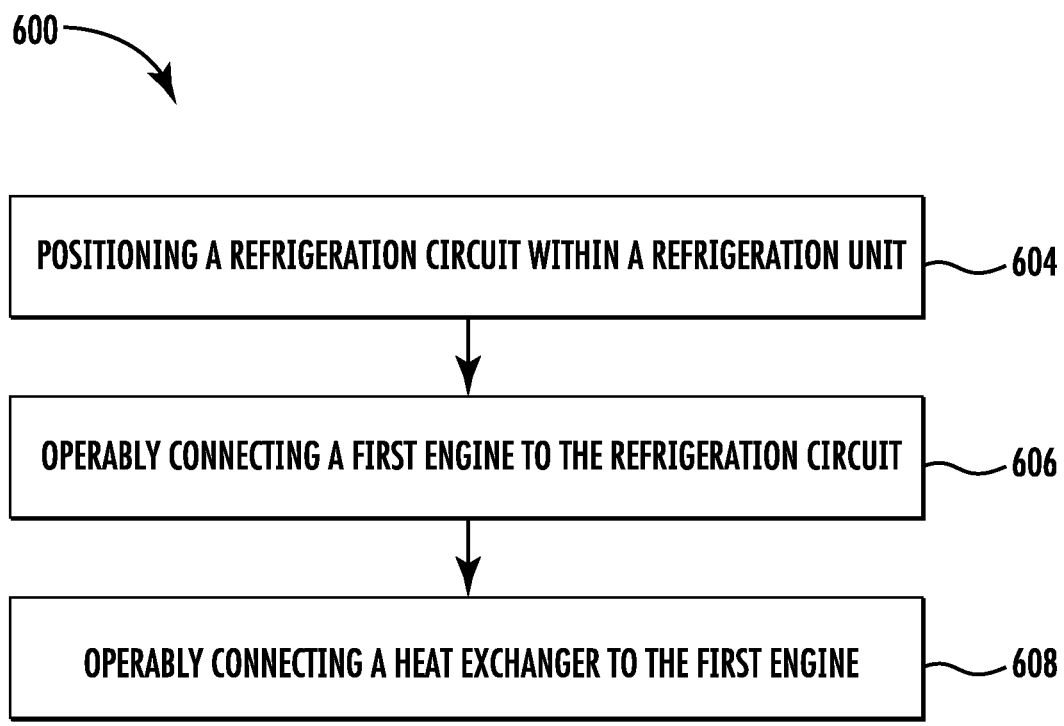
FIG. 6 is a flow diagram illustrating a method for assembling a transport refrigeration system, according to an embodiment of the present disclosure.

Referring now to FIG. 6, while referencing components of the transport refrigeration system 200 of FIGS. 1-4. FIG. 6 shows a flow process illustrating a method 600 of assembling the transport refrigeration system 200, according to an embodiment of the present disclosure. At block 604, the refrigeration circuit 23 is positioned within a refrigeration unit 22. As mentioned above, the refrigeration circuit 23 having a refrigerant heat rejection heat exchanger 34 and a fan 40 configured to blow air 133 across the refrigerant heat rejection heat exchanger 34. At block 606, the first engine 26 is operably connected to the refrigeration circuit 23. In the illustrated embodiment, the first engine 26 is operably connected to the refrigeration circuit 23 at the refrigerant compression device 32. As mentioned above, the first engine 26 is configured to power the refrigeration unit 22 and has the engine coolant circuit 80 and the exhaust outlet 27.

At block 608, the heat exchanger 70 is operably connected to the first engine 26. As mentioned above, the heat exchanger 70 has a first fluid 72 passage fluidly connected to the exhaust outlet 27; a second fluid passage 74 fluidly connected to the engine coolant circuit 80; and a third fluid passage 76 fluidly connected to and configured to receive air 133 blown across the refrigerant heat rejection heat exchanger 34. The second fluid passage 74 is thermally connected to the first fluid passage 72 and the third fluid passage 76 is thermally connected to the first fluid passage 72.

While the above description has described the flow process of FIG. 6 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration system, the method comprising:
   cooling, using a refrigeration unit, a refrigerated cargo space, the refrigeration unit having: a refrigerant heat rejection heat exchanger and a fan configured to blow air across the refrigerant heat rejection heat exchanger;
   powering, using a first engine, the refrigeration unit, the first engine having an engine coolant circuit with an engine coolant and an exhaust outlet, the engine coolant circuit being configured to remove heat from the first engine;
   cooling, using a heat exchanger, engine exhaust gas from the exhaust outlet, the heat exchanger comprising:
      a first fluid passage fluidly connected to the exhaust outlet, the first fluid passage being configured to receive engine exhaust gas from the exhaust outlet;
      a second fluid passage fluidly connected to the engine coolant circuit' the second fluid passage being thermally connected to the first fluid passage, wherein the engine coolant circuit is configured to circulate the engine coolant through the first engine and the second fluid passage is configured to circulate the engine coolant through the heat exchanger, and wherein the heat exchanger is configured to transfer heat from the engine exhaust gas within the first fluid passage to the engine coolant within the second fluid passage to cool the engine exhaust gas; and
      a third fluid passage fluidly connected to and configured to receive air blown across the refrigerant heat rejection heat exchanger, the third fluid passage being thermally connected to the first fluid passage and the second fluid passage,
   wherein the heat exchanger is configured transfer heat from the engine exhaust gas in the first fluid passage to the air in the third fluid passage to cool the engine exhaust gas,
   wherein the first fluid passage, the second fluid passage, and the third fluid passage are contained within the heat exchanger.

2. The method of claim 1, wherein:
   the first fluid passage is fluidly connected to the engine exhaust outlet through a muffler.

3. The method of claim 1, further comprising:
   powering the first engine using at least one of compressed natural gas and liquefied natural gas.

4. The method claim 1, further comprising:
   circulating engine coolant through the coolant circuit and the second fluid passage;
   flowing engine exhaust gas through the first fluid passage; and
   cooling the engine exhaust gas by using the engine coolant to absorb heat.

5. The method of claim 1, further comprising:
   blowing air across the refrigerant heat rejection heat exchanger and through the third fluid passage;
   flowing engine exhaust gas through the first fluid passage; and
   cooling the engine exhaust gas by using the air blown across the refrigerant heat rejection heat exchanger to absorb heat.

6. A method of assembling a transport refrigeration system comprising:
   positioning a refrigeration circuit within a refrigeration unit, the refrigeration circuit having a refrigerant heat rejection heat exchanger and a fan configured to blow air across the refrigerant heat rejection heat exchanger;
   operably connecting a first engine to the refrigeration circuit, the first engine being configured to power the refrigeration unit and having an engine coolant circuit with an engine coolant and an exhaust outlet, the engine coolant circuit being configured to remove heat from the first engine;
   operably connecting a heat exchanger to the first engine, the heat exchanger comprising:
   a first fluid passage fluidly connected to the exhaust outlet, the first fluid passage being configured to receive engine exhaust gas from the exhaust outlet;
   a second fluid passage fluidly connected to the engine coolant circuit, the second fluid passage being thermally connected to the first fluid passage, wherein the engine coolant circuit is configured to circulate the engine coolant through the first engine and the second fluid passage is configured to circulate the engine coolant through the heat exchanger, and wherein the heat exchanger is configured to transfer heat from the engine exhaust gas within the first fluid passage to the engine coolant within the second fluid passage to cool the engine exhaust gas; and
   a third fluid passage fluidly connected to and configured to receive air blown across the refrigerant heat rejection heat exchanger, the third fluid passage being thermally connected to the first fluid passage and the second fluid passage, wherein the heat exchanger is configured transfer heat from the engine exhaust gas in the first fluid passage to the air in the third fluid passage to cool the engine exhaust gas,
   wherein the first fluid passage, the second fluid passage, and the third fluid passage are contained within the heat exchanger.

7. The method of claim 6, wherein:
   the first fluid passage is fluidly connected to the engine exhaust outlet through a muffler.

8. The method of claim 6, wherein:
   the first engine is powered by at least one of compressed natural gas and liquefied natural gas.

9. A transport refrigeration system comprising:
   a refrigeration unit having: a refrigerant heat rejection heat exchanger and a fan configured to blow air across the refrigerant heat rejection heat exchanger;
   a first engine configured to power the refrigeration unit, the first engine having an engine coolant circuit with an engine coolant and an exhaust outlet, the engine coolant circuit being configured to remove heat from the first engine;
   a heat exchanger, comprising:
      a first fluid passage fluidly connected to the exhaust outlet, the first fluid passage being configured to receive engine exhaust gas from the exhaust outlet;
      a second fluid passage fluidly connected to the engine coolant circuit, the second fluid passage being thermally connected to the first fluid passage, wherein the engine coolant circuit is configured to circulate the engine coolant through the first engine and the second fluid passage is configured to circulate the engine coolant through the heat exchanger, and wherein the heat exchanger is configured to transfer heat from the engine exhaust gas within the first fluid passage to the engine coolant within the second fluid passage to cool the engine exhaust gas; and
      a third fluid passage fluidly connected to and configured to receive air blown across the refrigerant heat rejection heat exchanger, the third fluid passage being thermally connected to the first fluid passage and the second fluid passage, wherein the heat exchanger is configured transfer heat from the engine exhaust gas in the first fluid passage to the air in the third fluid passage to cool the engine exhaust gas, wherein the first fluid passage, the second fluid passage, and the third fluid passage are contained within the heat exchanger.

10. The transport refrigeration system of claim 9, wherein:

the first fluid passage is fluidly connected to the engine exhaust outlet through a muffler.

11. The transport refrigeration system of claim 9, wherein:

the first engine is powered by at least one of compressed natural gas and liquefied natural gas.

* * * * *